US005485048A

United States Patent [19]
Kuragaki et al.

[11] Patent Number: 5,485,048
[45] Date of Patent: Jan. 16, 1996

[54] BRUSH DEVICE HAVING A PAIR OF U-SHAPED ATTACHING PIECES AND TAP ACCOMMODATING HOLES

[75] Inventors: Akira Kuragaki; Shigeru Shiroyama, both of Himeji, Japan

[73] Assignee: Mitsubishi Denki Kabushiki Kaisha, Tokyo, Japan

[21] Appl. No.: 241,996

[22] Filed: May 12, 1994

Related U.S. Application Data

[62] Division of Ser. No. 1,745, Jan. 7, 1993, Pat. No. 5,332,940.

[30] Foreign Application Priority Data

| Jan. 31, 1992 | [JP] | Japan | 4-045891 |
| Jan. 31, 1992 | [JP] | Japan | 4-045892 |
| Jan. 31, 1992 | [JP] | Japan | 4-045893 |
| Jan. 31, 1992 | [JP] | Japan | 4-045894 |

[51] Int. Cl.⁶ .................................................. H02K 13/00
[52] U.S. Cl. ........................................ 310/239; 310/242
[58] Field of Search .................................... 310/238, 239, 310/240, 242, 245, 247

[56] References Cited

U.S. PATENT DOCUMENTS

| 3,493,802 | 2/1970 | Barthruff et al. | 310/247 |
| 4,355,253 | 10/1982 | Vollbrecht | 310/239 |
| 4,475,053 | 2/1984 | Mayer | 310/239 |
| 4,498,230 | 2/1985 | Harris et al. | 310/242 |
| 4,673,838 | 6/1987 | Takagi et al. | 310/239 |
| 4,746,828 | 5/1988 | Nado et al. | 310/239 |
| 4,891,539 | 1/1990 | Okamoto et al. | 310/239 |
| 4,926,078 | 5/1990 | Isozumi et al. | 310/71 |
| 5,159,221 | 10/1992 | Miyazaki et al. | 310/239 |
| 5,280,210 | 1/1994 | Kress et al. | 310/239 |
| 5,329,198 | 7/1994 | Schmidt et al. | 310/239 |
| 5,332,940 | 7/1994 | Kuragaki et al. | 310/239 |
| 5,402,027 | 3/1995 | Strobl | 310/239 |

FOREIGN PATENT DOCUMENTS 145455  9/1987  Japan ........................ 310/239

OTHER PUBLICATIONS

Journal of Nippondenso Technical Disclosure, Feb. 15, 1990 p. 177.

Primary Examiner—Matthew V. Nguyen
Attorney, Agent, or Firm—Sughrue, Mion, Zinn, Macpeak and Seas

[57] ABSTRACT

A brush device having a brush holding frame made of an insulation material provided with a plurality of brush accommodating portions which are open at end portions thereof in the axial direction and at inner peripheral portions thereof in the radial direction, and a pair of protruded portions at opposing outer ends thereof in the radial direction; brushes accommodated in the brush accommodating portions along with brush springs, press-contacting a commutator of a direct current machine; an insulation plate touching an end face of the brush holding frame in the axial direction, covering the open portions at the end portions of the brush accommodating portion; and a pair of U-shaped attaching pieces mounted on and pinching both end faces of the pair of protruded portions of the brush holding frame thereby fixing the insulation plate to the end face of the brush holding frame in the axial direction comprises tap accommodating holes previously provided for accommodating front ends of taps for machining tapped holes at positions of first straight portions of said U-shaped attaching pieces in correspondence to tapped holes of second straight portions of said U-shaped attaching pieces.

1 Claim, 10 Drawing Sheets

FIGURE 9A  FIGURE 9B
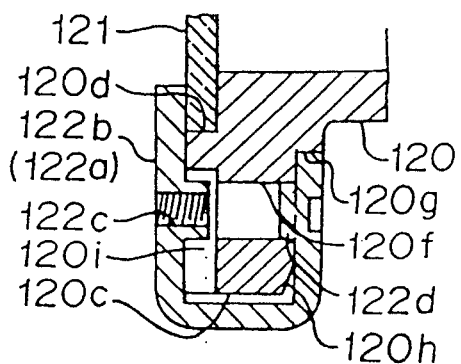
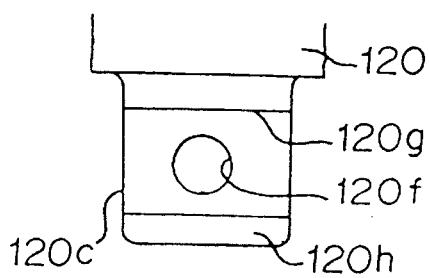
FIGURE 10
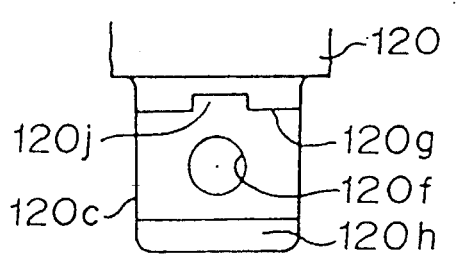
FIGURE 11A  FIGURE 11B  FIGURE 11C
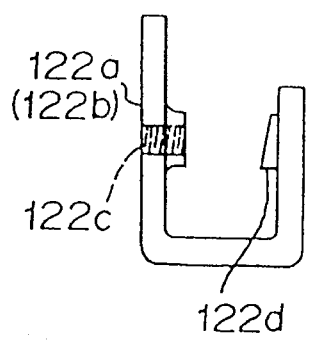
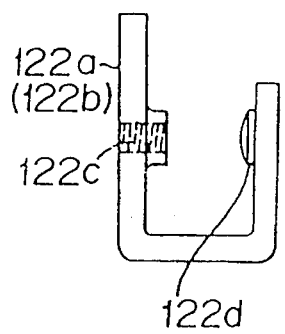
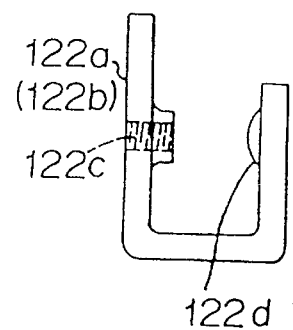

FIGURE 12A PRIOR ART
FIGURE 12B PRIOR ART
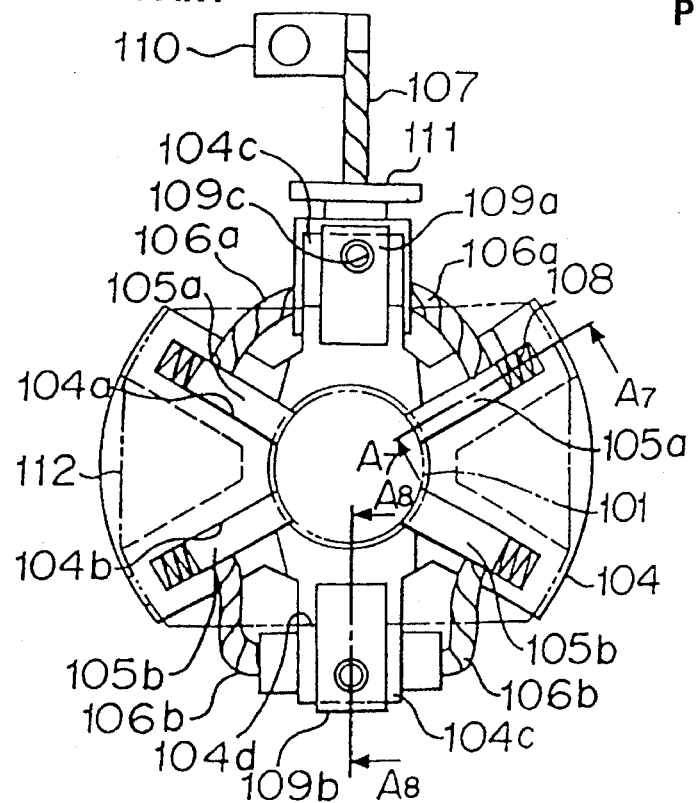
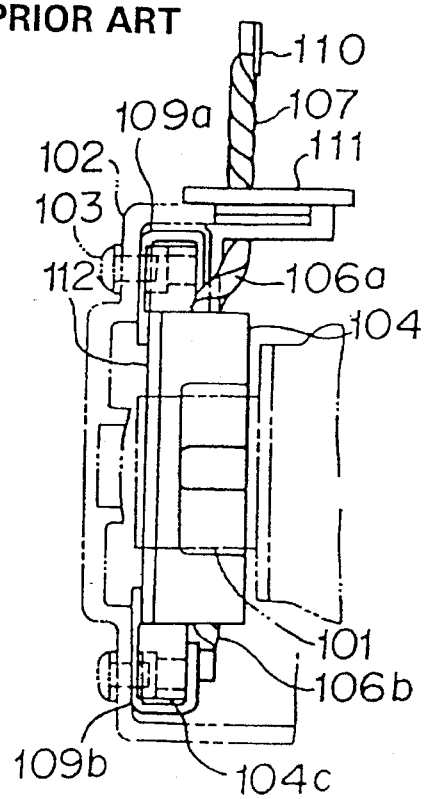
FIGURE 13 PRIOR ART
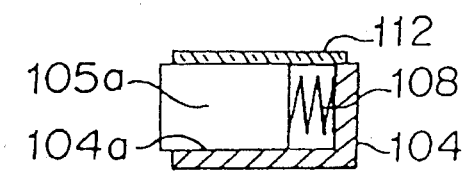
FIGURE 14 PRIOR ART
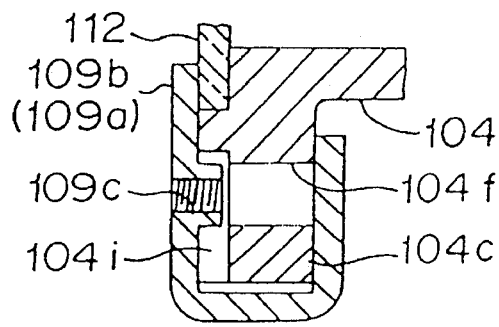

5,485,048

BRUSH DEVICE HAVING A PAIR OF U-SHAPED ATTACHING PIECES AND TAP ACCOMMODATING HOLES

This is a divisional of application Ser. No. 08/001,745, filed Jan. 7, 1993, now U.S. Pat. No. 5,332,940.

The present invention relates to a brush device for a direct current machine such as a starter motor.

FIGS. 4A and 4B show a front view and a side view of a first conventional brush device. In FIGS. 4A and 4B, a reference numeral 1 designates a commutator of a direct current machine, 4, a brush holding frame, for instance, formed by a synthetic resin, which is provided with pairs of brush accommodating portions 4a and 4b which are open at end portions thereof and at inner peripheral portions thereof in the radial direction. The brush accommodating portions 4a accommodate positive brushes 5a and brush springs 8, and the brush accommodating portions 4b accommodate negative brushes 5b and the brush springs 8. In the brush holding frame 4, a pair of protruded portions 4c are extended in the radial direction, on the side of an end face of which a stepped stopper portion 4d is formed, and a pair of stopper protrusions 4e are formed at intermediate positions with respect to the peripheral direction of the pair of protruded portions 4c. As shown by a chain line in FIG. 4A, an insulation plate 12 touches an end face of the brush holding frame 4, engages with the stepped stopper portion 4d and the stopper protrusions 4e, thereby positioning the insulation plate 12 vertically and horizontally, and covers the open portions of the end portions of the brush accommodating portions 4a and 4b. FIG. 6 is a front view of the insulation plate 12. FIGS. 5A and 5B are sectional diagrams of the brush accommodating portion 4a and the stopper protrusion 4e of FIG. 4A.

In FIGS. 4A and 4B, the insulation plate 12 is pinched and fixed to the protruded portions 4c by a pair of attaching pieces 9a and 9b made of a metallic material. Lead wires 6a are extended from the pair of brushes 5a and are connected to a lead wire 7. The lead wire 7 is fitted with a grommet 11 and connected to a terminal 10 at an end thereof. Lead wires 6b are extended from the pair of brushes 5b and connected to the attaching piece 9b.

As shown in FIG. 4B, the brush device integrated as above is mounted on an inner face of an end portion of a rear bracket 2 (shown by a chain line) of a starter motor by screwing screws 3 into tapped holes 9c thereby fixing the attaching pieces 9a and 9b. The rear bracket 2 fixed with the brush device is connected to a front bracket (not shown) by through bolts through a yoke (not shown) of the starter motor. The brushes 5a and 5b are press-contacted to the commutator (shown by a chain line) for flowing current.

In the above conventional brush device, the insulation plate 12 is stopped of its relative motion vertically and horizontally by the stepped stopper portion 4d of the brush holding frame 4 and the stopper protrusions 4e, and is pinched by the attaching pieces 9a and 9b. However, there is a play in the assembly due to working tolerances of the respective corresponding parts. Especially, although the insulating plate 12 is pinched by the attaching pieces 9a and 9b only at the two places on the top side and on the bottom side thereof, the left and right portions thereof float from the end portions of the brush holding frame 4 and vibrate by an outside vibration. As a result, in the insulating plate 12, wear is promoted at the engaging portions by this vibration, the play is magnified, a mismatch is caused and a trouble is brought about in the receiving operation of the brushes 5a and 5b at sides thereof in the width direction.

FIGS. 12A and 12B show a front view and a side view of a second conventional brush device. In FIGS. 12A and 12B, a reference numeral 101 designates a commutator of a direct current machine, 104, a brush holding frame, for instance, formed by a synthetic resin, which is provided with pairs of brush accommodating portions 104a and 104b which are open at end portions thereof and at inner peripheral portions thereof in the radial direction. The brush accommodating portions 104a accommodate positive brushes 105a and brush springs 108, whereas the brush accommodating portions 104b accommodate negative brushes 105b and the brush springs 108. In the brush holding frame 104, a pair of protruded portions 104c are extended in the radial direction. As shown in FIG. 12A by a chain line, an insulation plate 112 touches an end face of the brush holding frame 104, engages with a stepped stopper portion 104d and covers the open portions at the end portions of the brush accommodating portions 104a and 104b. FIG. 13 is a sectional diagram showing the brush accommodating portion 104a of FIG. 12A.

In FIGS. 12A and 12B, the insulation plate 112 are pinched and fixed to the protruded portions 104c by a pair of attaching pieces 109a and 109b made of a metallic material. Lead wires 106a are extended from the pair of brushes 105a and connected to a lead wire 107. The lead wire 107 is fitted with a grommet 111 and is connected to a terminal 110 at an end thereof. Furthermore, lead wires 106b are extended from the pair of brushes 105b and connected to the attaching pieces 109b. FIG. 14 is a sectional diagram taken along a line $A_8$—$A_8$ of FIG. 12A. numeral 104f designates a screw accommodating hole of an attaching screw 103 (refer to FIG. 12B) provided at the protruded portion 104c of the brush holding frame 104. A numeral 104i designates slots provided at the protruded portions 104c for passing burring portions which are provided with tapped holes 109c of the attaching pieces 109a and 109b.

As shown in FIG. 12B, the brush device integrated as above, is fixed to an inner face of an end portion of a rear bracket 102 (shown by a chain line) of a starter motor, by screwing the screws 103 into the tapped holes 109c thereby fixing the attaching pieces 109a and 109b. The rear bracket 102 fixed with the brush device is connected to a front bracket (not shown) by through bolts through a yoke (not shown) of the starter motor. The brushes 105a and 105b are press-contacted to the commutator 101 (shown by a chain line) for flowing current.

In the above conventional brush device, the attaching pieces 109a and 109b are only fixed by pinching them to the protruded portions 104c of the brush holding frame 104. Therefore, when the direct current machine receives a vibration, the brush holding frame 104 and the attaching pieces 109a and 109b vibrate separately, wear is generated at the fitting portions for the both, a play is generated therebetween, destruction is caused and the contact operation of the brushes 105a and 105b to the commutator 1 is hampered. Furthermore, the positioning accuracy of the attaching pieces 109a and 109b with respect to the protruded portions 104c of the brush holding frame 104, is low and the operation of attaching the brush device to the rear bracket is difficult.

FIGS. 18A and 18B are a front view and a side view of a third conventional brush device. In FIGS. 18A and 18B, a reference numeral 201 designates a commutator of a direct current machine, and 204, a brush holding frame, for instance, formed of a synthetic resin, which is provided with pairs of brush accommodating portions 204a and 204b which are open at end portions thereof and at inner peripheral portions thereof in the radial direction. The brush accommodating portions 204a accommodate positive brushes 205a and brush springs 208, whereas the brush accommodating portions 204b accommodate negative brushes 205b and the brush springs 208. In the brush holding frame 204, a pair of protruded portions 204c are extended in the radial direction. As shown in FIG. 18A by a chain line, an insulation plate 212 touches an end face of the brush holding frame 204, engages with a stepped stopper portion 204d and covers the open portions at the end portions of the brush accommodating portions 204a and 204b. FIG. 19 is a sectional diagram of the brush accommodating portion 204a of FIG. 18A. In FIGS. 18A and 18B, the insulation plate 212 is pinched and fixed to the protruded portions 204c by a pair of attaching pieces 209a and 209b made of a metallic material. Lead wires 206a are extended from the pair of brushes 205a and are connected to a lead wire 207. The lead wire 207 is fitted with a grommet 211, and is connected to a terminal 210 at an end thereof. Lead wires 206b are extended from the pair of brushes 205b and are connected to the attaching piece 209b.

As shown in FIG. 18B, the brush device integrated as above, is mounted on an inner face of an end portion of a rear bracket 202 (shown by a chain line) of a starter motor, by screwing screws 203 into tapped holes 209c thereby fixing the attaching pieces 209a and 209b. The rear bracket 202 attached with the brush device is connected to a front bracket (not shown) by through bolts through a yoke (not shown) of the starter motor. The brushes 205a and 205b are press-contacted to the commutator 201 (shown by a chain line) for flowing current.

In the U-shaped attaching pieces 209a and 209b of the conventional brush device, as shown in FIG. 20A by a side sectional diagram and FIG. 20B by a bottom view, when a tapping is performed to form the tapped holes 209c at first straight portions thereof, since a space between the first straight portion and a second straight portion thereof is small, a front end of a tap 215 touches the second straight portion, and therefore, a complete tapping can not be performed. Therefore, several kinds of special taps are to be prepared and exchanged to successively work out a complete screw out of the incomplete screw and the machining thereof is difficult. Furthermore, when the length of a female screw is shortened to avoid the above problem, the number of the thread ridges screwed in the tapped holes becomes small and the thread ridges are crushed by the screwing.

FIGS. 24A and 24B show a front view and a side view of a fourth conventional brush device. In FIGS. 24A and 24B, a reference numeral 301 designates a commutator of a direct current machine, and 304, a brush holding frame, for instance, formed by a synthetic resin, which is provided with pairs of brush accommodating portions 304a and 304b and which are open at end portions thereof and at inner peripheral portions thereof in the radial direction. The brush accommodating portions 304a accommodate positive brushes 305a and brush springs 308, whereas the brush accommodating portions 304b accommodate negative brushes 305b and the brush springs 308. In the brush holding frame 304, a pair of protruded portions 304c are extended in the radial direction. As shown in FIG. 24A by a chain line, an insulation plate 312 touches an end face of the brush holding frame 304, engages with a stepped stopper portion 304d and covers the open portions of the end portions of the brush accommodating portions 304a and 304b. FIG. 25 is a sectional diagram showing the brush accommodating portion 304a of FIG. 24A.

In FIGS. 24A and 24B, the insulation plate 312 is pinched and mounted to the protruded portions 304c by a pair of attaching pieces 309a and 309b. Lead wires 306a are extended from the pair of brushes 305a and are connected to a lead wire 307. The lead wire 307 is fitted with a grommet 311 and is connected to a terminal 310 at an end thereof. Lead wires 306b are extended from the pair of brushes 305b and are connected to the attaching piece 309b.

The integration of the brush device assembled as above to a motor is carried out as follows. First, a front bracket of the starter motor is placed in a standing setup of a motor, on which a yoke portion is placed. The armature is inserted into the assembly of the front of the yoke portion with the commutator 301 placed on the top side thereof. The brush device is tentatively placed at the periphery of the commutator 301. A rear bracket 302 is placed on the yoke from the top side. Through bolts 316 are passed through thereby tightening and connecting the rear bracket 302 to the front bracket. Next, screws 303 are screwed to tapped holes 309c of the attaching pieces 309a and 309b from the top side of the rear bracket 302, thereby fixing the brush device and press-contacting the brushes 305a and 305b to the commutator 301.

In the above conventional brush device, as for the mounting thereof, the positioning of the attaching pieces 309a and 309b of the brush device in the peripheral direction with respect to the positions of the screws 303 of the rear bracket 302, is difficult and takes much time.

It is an object of the present invention to solve the above problem of the first conventional example and to provide a brush device wherein an insulation plate is fixed to an end face of a brush holding frame without play, wear at engaging portions is eliminated and a receiving operation at one side in the width direction of a brush is firmly maintained.

It is an object of the present invention to solve the problem of the second conventional example and to provide a brush device wherein attaching pieces are fixed to protruded portions of a brush holding frame with high positioning accuracy, a play between both is avoided, wear or destruction owing thereto at both engaging portions is eliminated and an operation of attaching thereof to a rear bracket is facilitated.

It is an object of the present invention to solve the problem of the third conventional example and to provide a brush device wherein a tapped hole working of a required length of a U-shaped attaching piece, can easily be carried out.

It is an object of the present invention to solve the problem of the fourth conventional example and to provide a brush device wherein an attaching piece of the brush device can easily be positioned to an attaching screw from a rear bracket thereby promoting the operational performance of integration.

According to a first aspect of the present invention, there is provided a brush device having a brush holding frame made of an insulation material provided with a plurality of brush accommodating portions which are open at end portions thereof in the axial direction and at inner peripheral portions thereof in the radial direction, and a pair of protruded portions at opposing outer ends thereof in the radial direction; brushes accommodated in said brush accommodating portions along with brush springs, press-contacting a commutator of a direct current machine; an insulation plate touching an end face of said brush holding frame in the axial direction, covering the open portions at said end portions of the brush accommodating portion; and a pair of attaching pieces mounted on and pinching both end faces of said pair of protruded portions of the brush holding frame thereby fixing said insulation plate to said end face of the brush holding frame in the axial direction comprising:

a pair of stopper protrusion portions protruded in the axial direction provided at intermediate positions situated between said pair of protruded portions in the peripheral direction on the end face of the brush holding frame; and a pair of engaging holes in the insulation plate for pressing in and fixing said pair of stopper protrusions, provided in correspondence therewith.

According to a second aspect of the present invention, there is provided the brush device according to the first aspect, further comprising cut-off portions provided at the inner peripheral portions of the pair of engaging holes and cut off in the radial direction thereof.

According to a third aspect of the present invention, there is provided a brush device having a brush holding frame made of an insulation material provided with a plurality of brush accommodating portions which are open at end portions thereof in the axial direction and at inner peripheral portions thereof in the radial direction, and a pair of protruded portions at opposing outer ends thereof in the radial direction; brushes accommodated in said brush accommodating portions along with brush springs, press-contacting a commutator of a direct current machine; an insulation plate touching an end face of said brush holding frame in the axial direction, covering the open portions at said end portions of the brush accommodating portion; a pair of U-shaped attaching pieces mounted on and pinching both end faces of said pair of protruded portions of the brush holding frame thereby fixing said insulation plate to said end face of the brush holding frame, and fixed to an inner end portion of a rear bracket of said direct current machine comprising:

engaging protrusions provided on inner faces of first straight portions of said U-shaped attaching pieces opposing second straight portions thereof having tapped holes; and engaging holes provided at rear end portions of the protruded portions of the brush holding piece for engaging with said engaging protrusions of the U-shaped attaching pieces.

According to a fourth aspect of the present invention, there is provided the brush device according to the third aspect, further comprising stepped portions provided at the rear end portions of the protruded portions of the brush holding piece for contacting similarly stepped portions provided at end portions of the first straight portions of the U-shaped attaching pieces.

According to a fifth aspect of the present invention, there is provided a brush device having a brush holding frame made of an insulation material provided with a plurality of brush accommodating portions which are open at end portions thereof in the axial direction and at inner peripheral portions thereof in the radial direction, and a pair of protruded portions at opposing outer ends thereof in the radial direction; brushes accommodated in said brush accommodating portions along with brush springs, press-contacting a commutator of a direct current machine; an insulation plate touching an end face of said brush holding frame in the axial direction, covering the open portions at said end portions of the brush accommodating portion; and a pair of U-shaped attaching pieces mounted on and pinching both end faces of said pair of protruded portions of the brush holding frame thereby fixing said insulation plate to said end face of the brush holding frame in the axial direction comprising:

tap accommodating holes previously provided for accommodating front ends of taps for machining tapped holes at positions of first straight portions of said U-shaped attaching pieces in correspondence to tapped holes of second straight portions thereof.

According to a sixth aspect of the present invention, there is provided a brush device having a plurality of and a brush holding frame formed by a synthetic provided with a plurality of brush accomodating portions resin comprising:

a pair of guiding-through portions provided at outer peripheral sides of said brush holding frame in the axial direction;

a pair of through bolts passing through said pair of guiding-through portions from a rear bracket of a direct current machine; and attaching pieces for fixing said brush holding frame to said rear bracket, positioned by passing said pair of through bolts through the pair of guiding-through portions via the brush holding frame, said attaching pieces being screwed to the rear bracket by attaching screws.

In the first and second aspects of this invention, the insulation plate is positioned and fixed to the end face of the brush holding frame by pressing the pair of engaging holes to the corresponding pair of protruded stopper portions, without generating a play, covering the end portions of the brush accommodating portions in the axial direction. Furthermore, by providing the cut-off portions at the inner peripheries of the engaging holes, the engaging holes can easily be pressed to the protruded engaging portions even when there is a positional deviation between the engaging holes and the protruded engaging portions by working tolerances.

In the third and fourth aspects of the present invention, as for the attaching pieces fitted to and mounted on the protruded portions of the brush holding frame, the engaging protrusions engage with the engaging holes of the protruded portions of the brush holding frame, thereby eliminating the play between the both and promoting the positioning accuracy.

Furthermore, since the end portion of the first straight portion piece of the attaching piece contact the stepped portion of the protruded portion, the play between the both is further reduced.

In the fifth aspect of the present invention, in working out the tapped hole by the tap at the first straight portion of the attaching piece, the front end portion of the tap is accommodated by the tap accommodating portion of the second piece thereof, thereby working a complete tapped hole in a single motion by a single kind of tap.

In the sixth aspect of the present invention, in the assembling operation, when the through bolts are to be passed in the axial direction from the rear bracket through the brush device which is tentatively placed on the commutator of the armature in the standing setup, the brush holding frame is positioned by passing the through bolts through the guiding-through portions of the brush holding frame. In this way, the tapped holes of the attaching pieces are positioned in accordance with the positions of the attaching male screw from the rear bracket. Therefore, the brush device can easily be attached to the motor by the attaching male screws.

In the drawings:

FIG. 9A is a sectional diagram taken along a line $A_3$—$A_3$ of FIG. 7A and FIG. 9B, a bottom view of a protruded portion of FIG. 9A;

FIG. 10 is a bottom view of a protruded portion of a brush holding frame showing a third embodiment of this invention and corresponding to FIG. 9B;

FIGS. 11A, 11B and 11C are respectively side views of attaching pieces showing a fourth, a fifth and a sixth embodiments of this invention;

FIGS. 12A and 12B are respectively a front view and a side view of a second conventional brush device;

Figure 25:
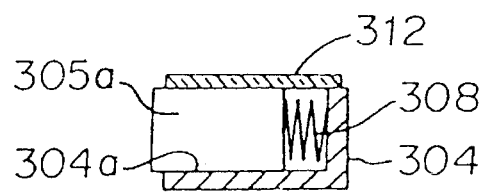
Figure 15A:
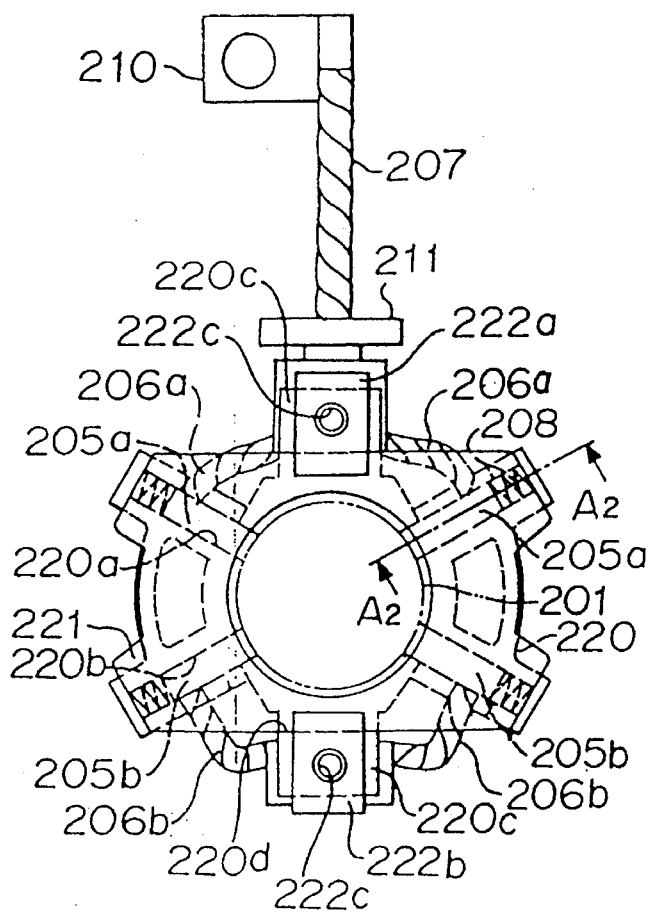
Figure 15B:
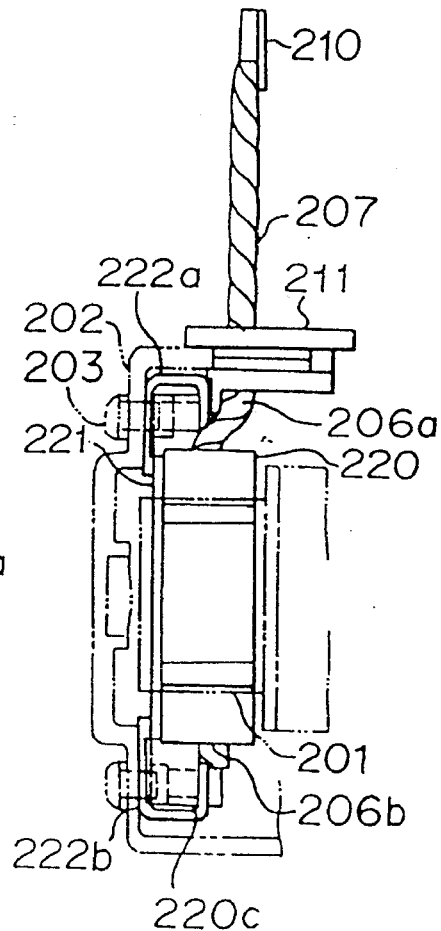
Figure 16:
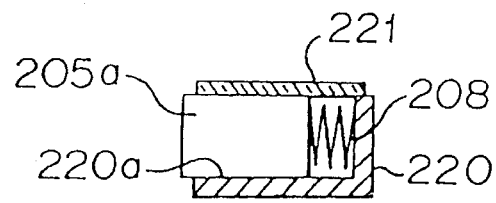
Figure 17A:
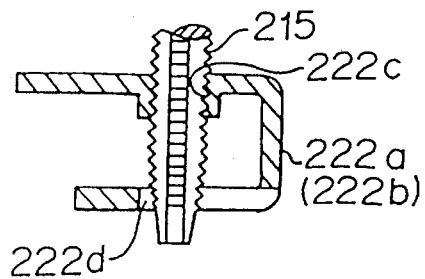
Figure 17B:
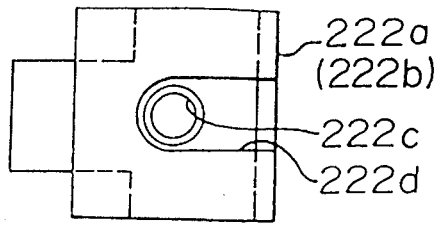
Figure 18A:
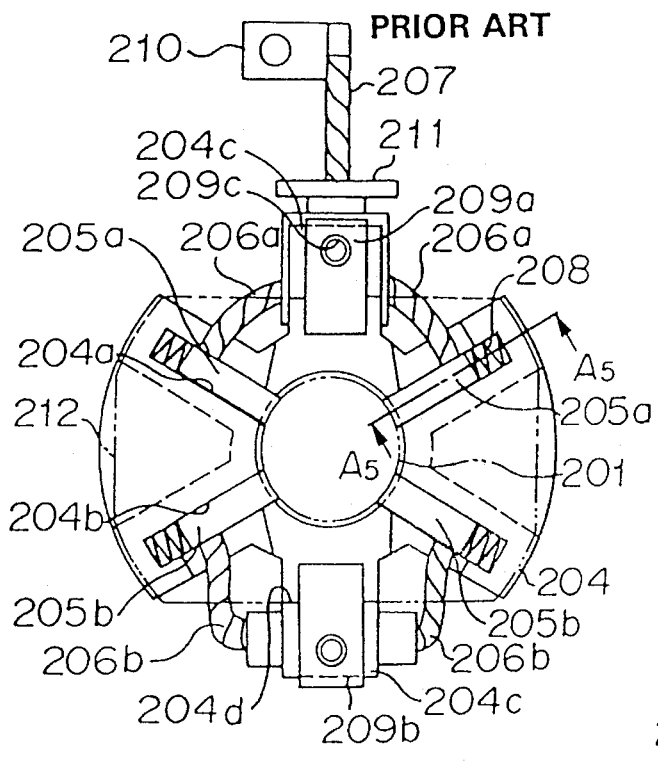
Figure 18B:
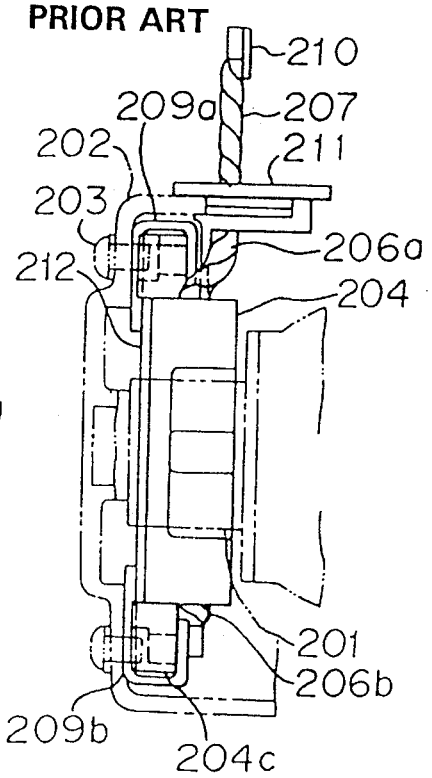
Figure 19:
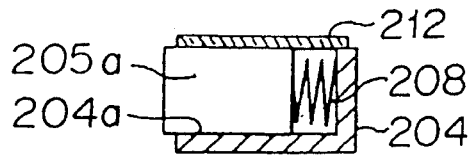
Figure 20A:
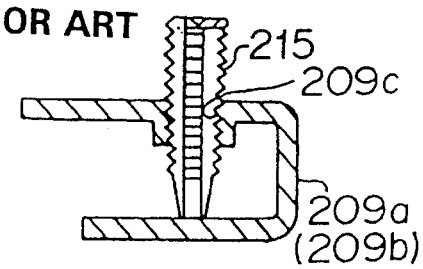
Figure 20B:
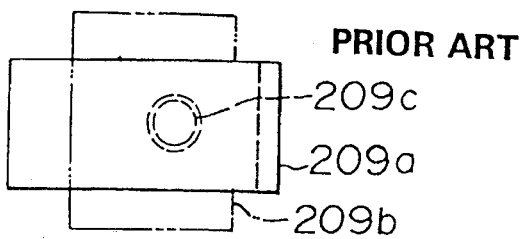
Figures 21A, 21B:
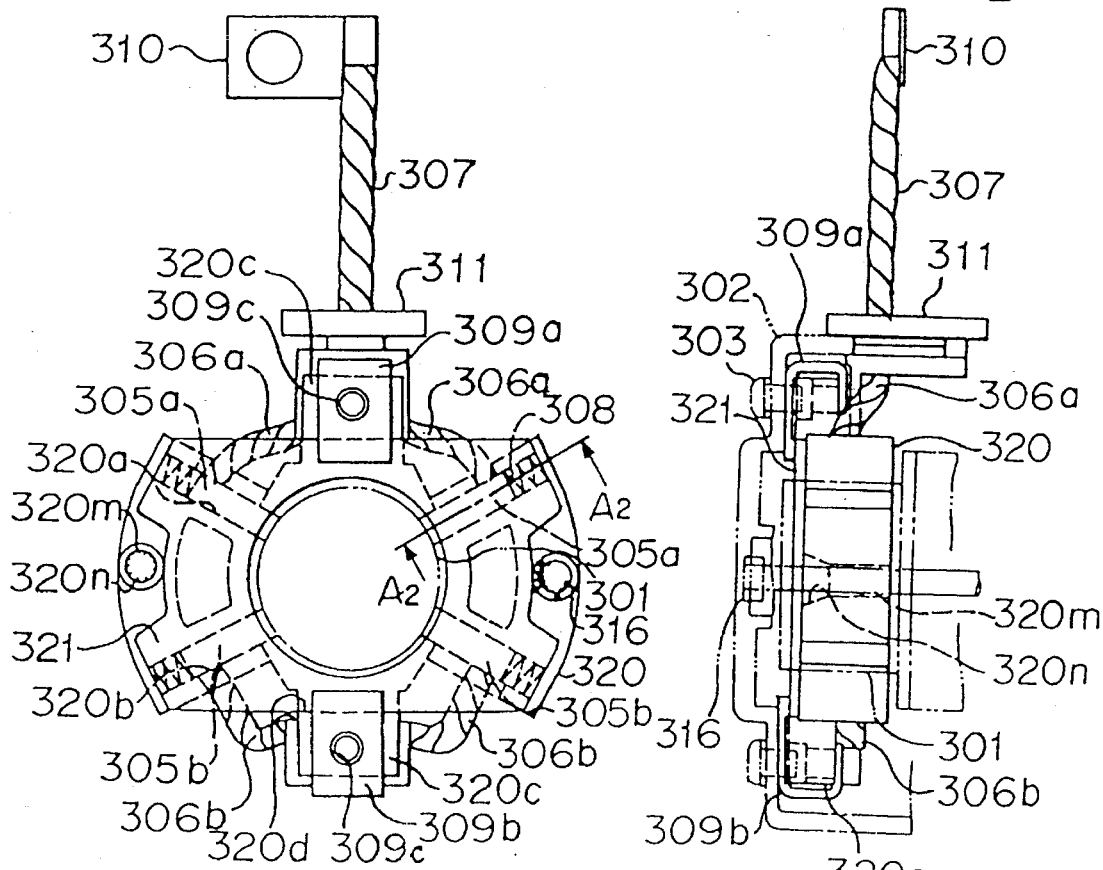
Figure 22:
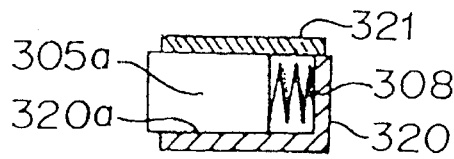
Figure 23:
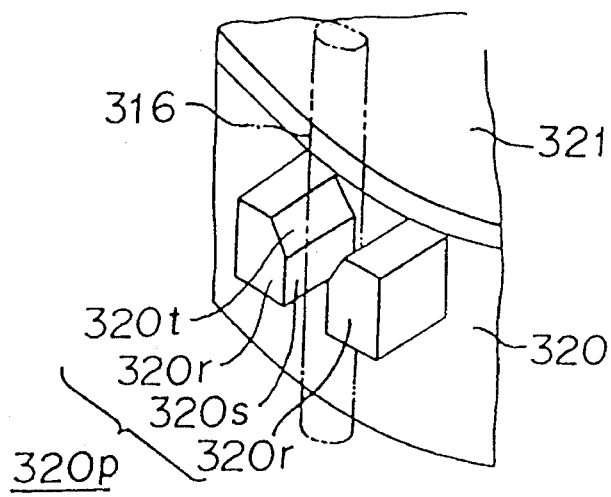
Figure 24A:
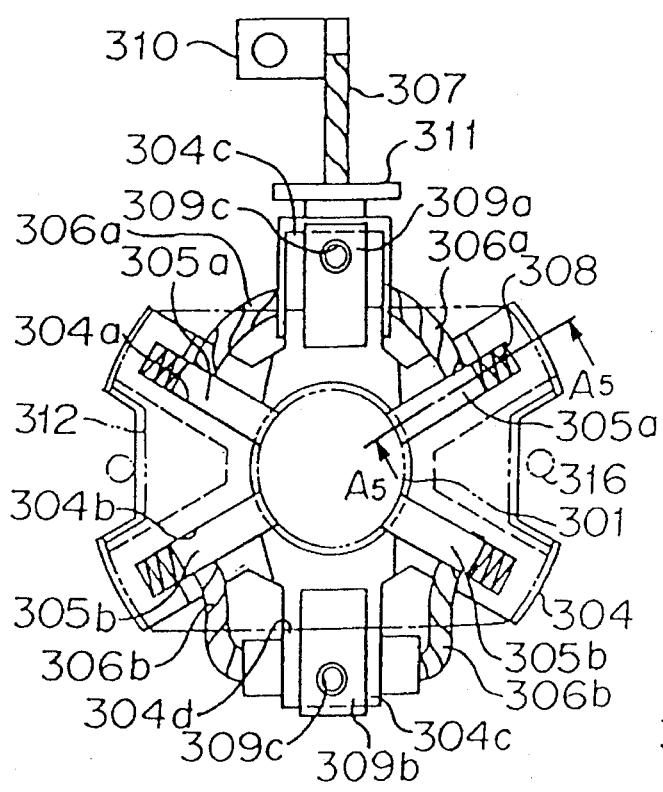
Figure 24B:
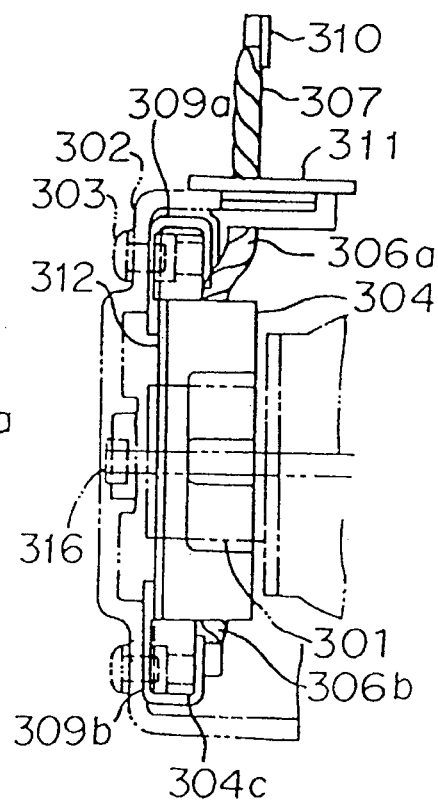

FIG. 13 is a sectional diagram taken along a line $A_7$—$A_7$ of FIG. 12A; FIG. 14 is a sectional diagram taken along a line $A_8$—$A_8$ of FIG. 12A; FIGS. 15A and 15B are respectively a front view and a side view of a seventh embodiment of a brush device according to the present invention;

FIG. 16 is a sectional diagram taken along a line $A_2$—$A_2$ of FIG. 15A;

FIG. 17A is a side sectional diagram showing a working of a tapped hole of an attaching piece of FIGS. 15A and 15B and FIG. 17B, a bottom view of the attaching piece of FIG. 17A;

FIGS. 18A and 18B are respectively a front view and a side view of a third conventional brush device;

FIG. 19 is a sectional diagram taken along a line $A_5$—$A_5$ of FIG. 18A;

FIG. 20A is a side sectional diagram showing a working of a tapped hole of an attaching piece of FIGS. 18A and 18B, and FIG. 20B, a bottom view of the attaching piece of FIG. 20A;

FIGS. 21A and 21B are respectively a front diagram and a side diagram of an eighth embodiment of a brush device according to the present invention;

FIG. 22 is a sectional diagram taken along a line $A_2$—$A_2$ of FIG. 21A;

FIG. 23 is a perspective diagram showing a ninth embodiment of a guiding-through portion of a brush holding frame of this invention;

FIGS. 24A and 24B are respectively a front diagram and a side diagram of a fourth conventional brush device; and FIG. 25 is a sectional diagram taken along a line $A_5$—$A_5$ of FIG. 24A.

EXAMPLE 1

Figure 1A:
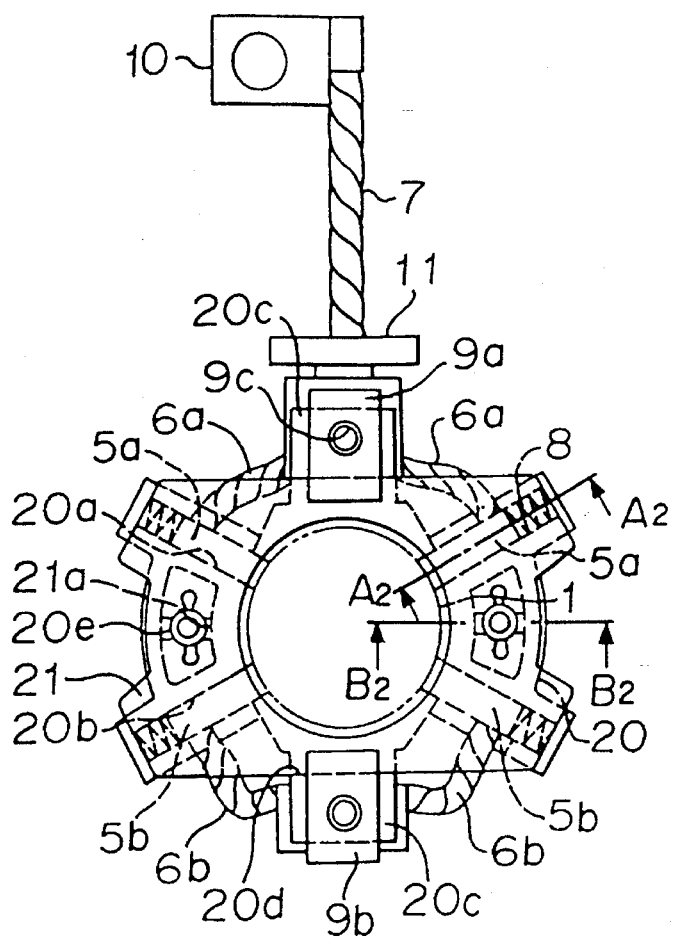
FIG. 1A and 1B are respectively a front diagram and a side diagram of the first embodiment of a brush device according to the present invention.
Figure 1B:
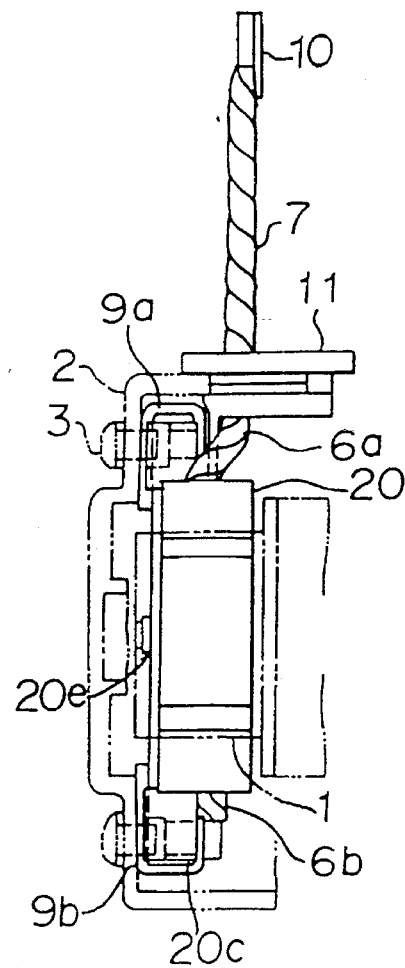
Figure 4A:
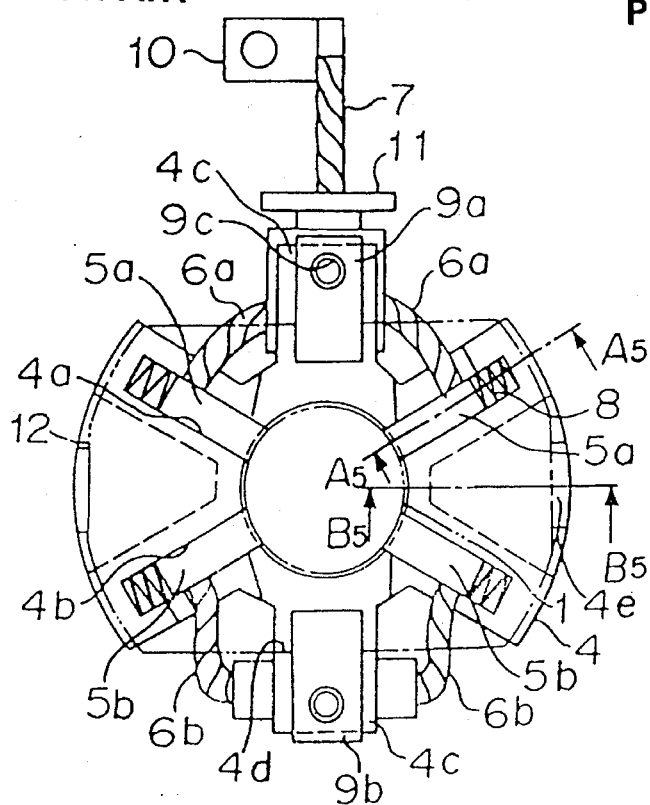
FIGS. 4A and 4B are respectively a front diagram and a side diagram of a first conventional brush device.
Figure 4B:
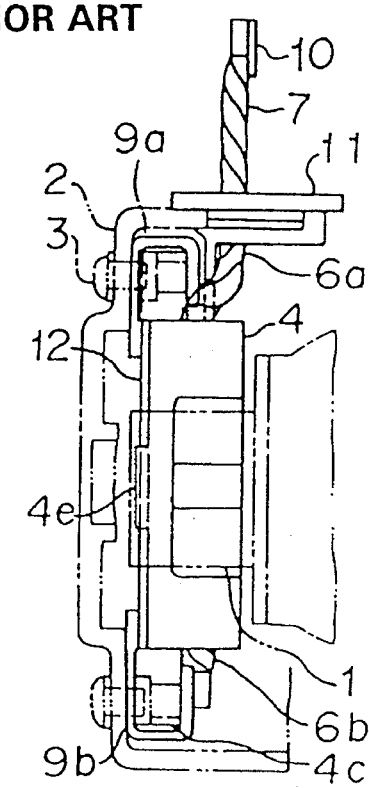
Figure 5A:
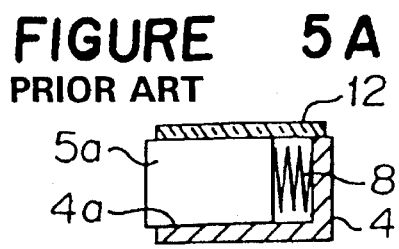
FIGS. 5A and 5B are sectional diagrams taken along a line $A_5$—$A_5$ and a $B_5$—$B_5$ of FIG. 4A.
Figure 5B:
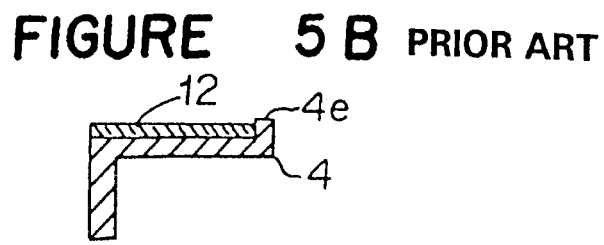
Figure 6:
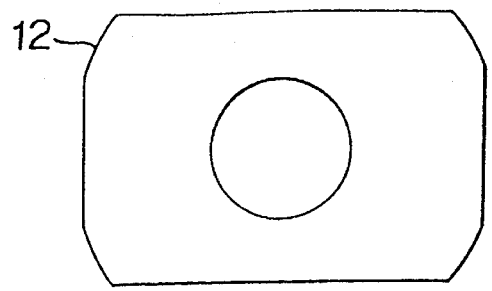
FIG. 6 is a front diagram of an insulation plate of FIG. 4A.

FIGS. 1A and 1B are respectively a front diagram and a side diagram of a brush device of this invention, wherein notations 1 through 3, 5a, 5b, 6a, 6b, 7, 8, 9a through 9c, 10 and 11 are the same as those in FIGS. 4A and 4B. A reference numeral 20 designates a brush holding frame, for instance, formed by a synthetic resin, which is provided with pairs of brush accommodating portions 20a and 20b which are open at end portions thereof in the axial direction and at the inner peripheral portions thereof in the radial direction. The brush accommodating portions 20a accommodate the positive brushes 5a and the brush springs 8, whereas the brush accommodating portions 20b accommodate the negative brushes 5b and the brush springs 8. In the brush holding frame 20, a pair of protruded portions 20c provided on the top side and the bottom side thereof in the radial direction, are extended and a stepped stopper portion 20d is formed on the side of an end face thereof. Furthermore, a pair of protruded stopper portions 20e are provided on the end face of the brush holding frame 20 at intermediate positions with respect to the peripheral direction of the pair of protruded portions 20c.

Figure 2A:
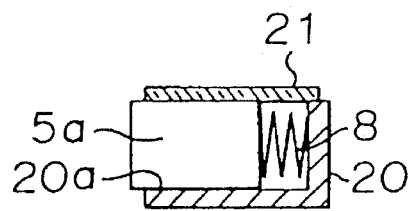
FIGS. 2A and 2B are sectional diagrams taken along a line $A_2$—$A_2$ and a line $B_2$—$B_2$ of FIG. 1A, respectively.
Figure 2B:
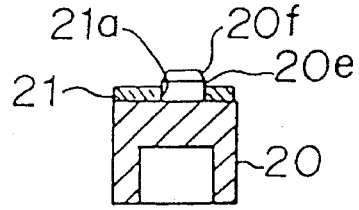

As shown in FIGS. 1A and 1B, an insulation plate 21 touches the end face of the brush holding frame 20 in the axial direction, engages with the stepped stopper portion 20d and engaging holes 21a provided on the left side and the right side of the insulation plate 21, are pressed in the protruded stopper portions 20e, thereby fixing and positioning the insulation plate 21. The insulation plate 21 is pinched and retained to the protruded portions 20c by the U-shaped attaching pieces 9a and 9b. FIG. 2A is a sectional diagram showing the brush accommodating portions 20a. FIGS. 2B is a sectional diagram showing the protruded stopper portion 20e. At the front end of the protruded stopper portion 20e, a chamfered portion 20f is provided such that an engaging hole 21a of the insulation plates 21 is easily fitted thereto. The chamfered portion 20f may be of an arcuate face.

Figure 3A:
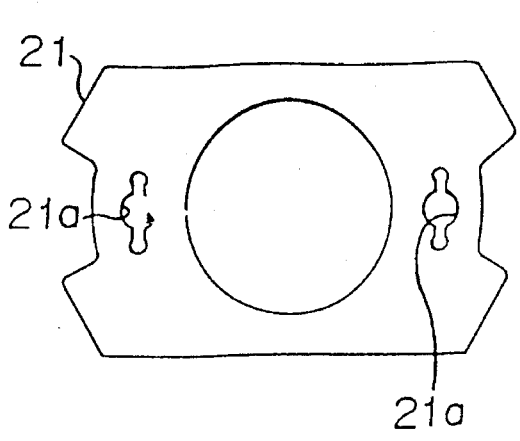
FIG. 3A is a front view of an insulation plate of FIG. 1A and FIG. 3B, a magnified diagram of an engaging hole portion of FIG. 3A.
Figure 3B:
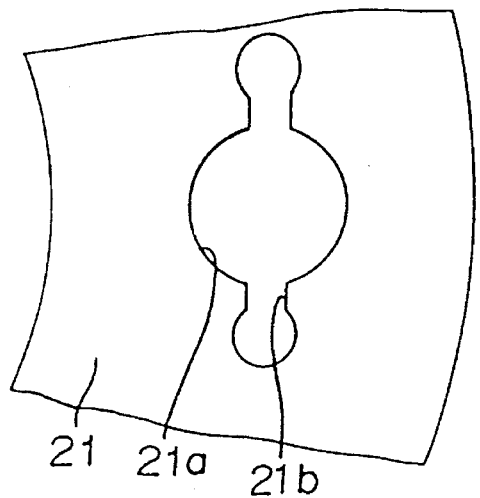

FIG. 3A is a front view showing the insulation plate 21. FIG. 3B is a magnified diagram showing the engaging hole 21a of the insulation plate 21. The engaging hole 21a is provided with an inner diameter smaller than an outer diameter of the protruded stopper portion 20e by an interference. A pair of cut-off portions 21b are provided at the inner peripheral portion of the engaging hole 21a in the radial direction. A circular portion is provided at the inner end of the cut-off portion 21b having a diameter larger than a cut-off width of the straight portion thereof. Furthermore, the circular portion may be substituted by a portion having an arcuate form.

The insulation plate 21 of which engaging holes 21a are pressed in the protruded stopper portions 20e of the brush holding frame 20, engages with the stepped stopper portion 20d of the brush holding frame 20 and touches the end face of the brush holding frame 20. In this state, the attaching pieces 9a and 9b are fitted to the protruded portions 20c thereby pinching and fixing the insulation plate 21. By providing the cut-off portions 21b to the engaging holes 21a of the insulation plate 21 at their inner peripheries, the protruded stopper portions 20e can easily be pressed in and fixed to the engaging hole 21a by the elastic deformation of the inner peripheries, even when the positions of the engaging holes 21a are a little deviated from those of the corresponding protruded stopper portions 20e.

As stated above, according to the present invention, a pair of protruded stopper portions are provided protruded in the axial direction, at intermediate positions between the pair of protruded portions of the brush holding frame in the peripheral direction and a pair of engaging holes are provided in the insulation plate which are pressed in the protruded stopper portions correspondingly. Therefore, the insulation plate is fixed to the end face of the brush holding frame with no floating separation, whereby vibration or generation of play is prevented and the receiving action of the brushes at side faces thereof in the width direction, is maintained with certainty. Furthermore, by providing the cut-off portions at the inner peripheries of the engaging holes of the insulation plate, the protruded stopper portions can easily be pressed in and fixed to the engaging holes even when there is a little positional deviation between the engaging holes and the protruded stopper portions of the brush holding frame.

EXAMPLE 2

Figure 7A:
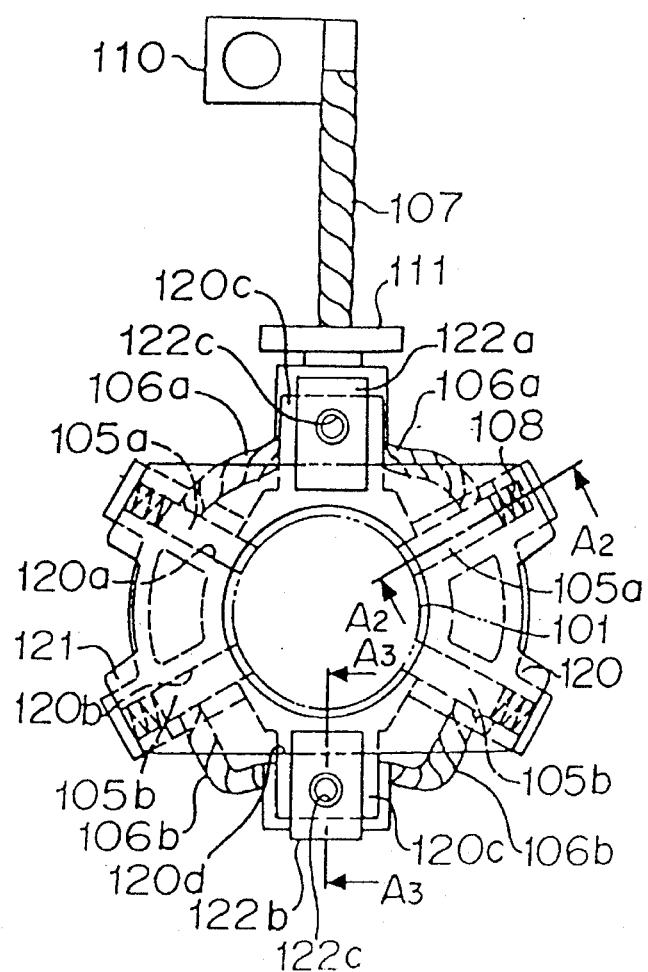
FIGS. 7A and 7B are respectively a front diagram and a side diagram of a second embodiment of a brush device according to the present invention.
Figure 7B:
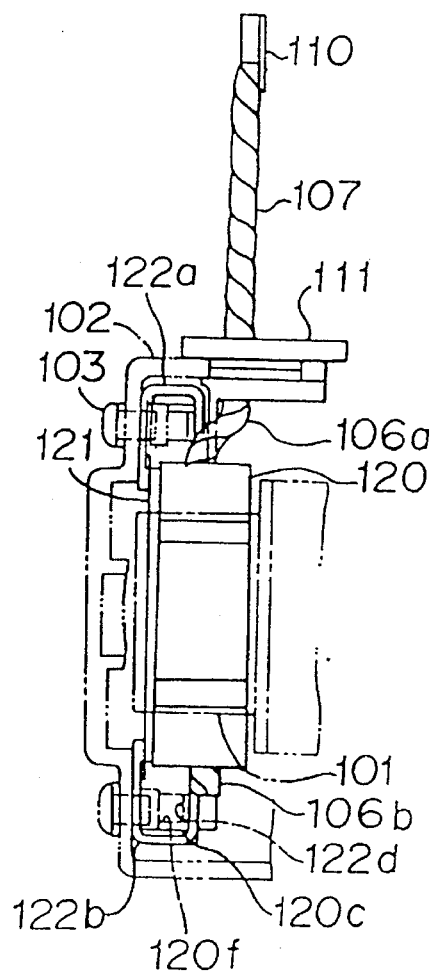

FIGS. 7A and 7B are respectively a front diagram and a side diagram of a second embodiment of a brush device according to the present invention, wherein notations 101 to 103, 105a, 105b, 106a, 106b, 107, 108, 110 and 111 are the same as in FIG. 12. A reference numeral 120 designates a brush holding frame, for instance, formed by a synthetic resin which is provided with pairs of brush accommodating portions 120a and 120b which are open at end portions thereof in the axial direction and inner peripheral portions thereof in the radial direction. The brush accommodating portions 120a accommodate the positive brushes 105a and the brush springs 108, whereas the brush accommodating portions 20b accommodate the negative brushes 105b and the brush springs 108. In the brush holding frame 120, a pair of protruded portions 120c are extended to the top side and the bottom side thereof in the radial direction, on the side of an end face of which a stepped stopper portion 120d is formed.

Figure 8:
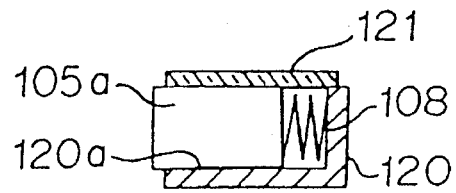
FIG. 8 is a sectional diagram taken along a line $A_2$—$A_2$ of FIG. 7A.

As shown in FIGS. 7A and 7B, an insulation plate 121 touches the end face of the brush holding frame 120 in the axial direction, and engages with the stepped stopper portion 120d. The insulation plate 121 is pinched and retained to the protruded portions 120c by U-shaped attaching pieces 122a and 122b made of a metallic material. Tapped holes 122c are provided at straight portions of the attaching pieces 122a and 122b. FIG. 8 is a sectional diagram showing the brush accommodating portion 120a.

FIG. 9A is a sectional diagram taken along a line $A_3$—$A_3$ of FIG. 7A. FIG. 9B is a bottom view of the protruded portion 120c of FIG. 9A. An engaging protrusion 122d is provided at an inner face of the other straight portion of the attaching piece 122b by pressing, which engages with an engaging hole 120f (also utilized as a screw accommodating hole for the screw 103) provided at the protruded portion 120c of the brush holding frame 120, performing a positioning and removing a play. A stepped portion 120g is provided at the other end face of the protruded portion 120c, or the rear side thereof, contacting an edge portion of the other straight portions of the attaching piece 122b. In this way, the play between the attaching piece 122b and the brush holding frame 120 is further reduced. A chamfered portion 120h is provided at an edge portion of a rear face on the outer periphery of the protruded portion 120c, thereby facilitating the fitting of the attaching pieces 122a and 122b. Slots 120i are provided at edge faces of the protruded portions 120c for passing burring portions provided with tapped holes 122c of the attaching pieces 122a and 122b. Furthermore, similar to the attaching piece 122b, the attaching piece 122a is also provided with the engaging protrusion 122d at an inner face of the other straight portion thereof, which engages with the engaging hole 120f of the protruded portion 120c, and an edge portion of the other straight portion thereof contacts the stepped portion 120g.

When the attaching pieces 122a and 122b are fitted to and pinch the protruded portions 120c of the brush holding frame 120, the engaging protrusions 122d engage with the engaging holes 120f, almost eliminating the play and promoting the positional accuracy. Furthermore, since no current flows in the attaching piece 122a, the attaching piece 122a may be made of a resilient material. However, since current flows in the attaching piece 122b to the ground, the attaching piece 122b is preferably made of an electricity-conductive metallic material, such as a brass or a phosphor bronze.

EXAMPLE 3

FIG. 10 is a bottom view showing a third embodiment of this invention and corresponding to the protruded portion 120c of the brush holding framed 120 of FIG. 9B. A cut-off portion 120j is provided at an intermediate portion of the stepped portion 120g of the protruded portion 120c. The edge portions of the other straight portions of the attaching pieces 122a and 122b are formed to contact the stepped portions 120g and the cut-off portions 120j, thereby engaging therewith also in the width direction and further preventing the play.

EXAMPLES 4 TO 6

FIGS. 11A, 11B and 11C are side diagrams of the attaching pieces 122a and 122b showing a fourth to a sixth embodiments, wherein the engaging protrusions 122d are formed by pressing such that the engaging protrusions 122d are easily inserted into the engaging holes 120f of the protruded portions 120c of the brush holding frame 120. In FIG. 11A, an end face of the engaging protrusion 122d is formed into a tapered face. In FIG. 11B, an end face of a cylinder of the engaging protrusion 122d is formed into a spherical shape. In FIG. 11c, an end face of the engaging protrusion 122d is made spherical.

Furthermore, in the above respective Examples, only one engaging protrusion 122d is provided at each of the attaching pieces 122a and 122b. However, a plurality of engaging protrusions 122d may be provided to a single attaching piece in the width direction and a plurality of engaging holes may be provided at the protruded portion 122c of the brush holding frame 120 which correspondingly engage therewith.

As state above, according to the present invention, the engaging protrusions are provided at the inner faces of the other straight portions of the U-shaped attaching pieces and the engaging holes are provided at the protruded portions of the brush holding frame which engage with the engaging protrusions. Therefore, the attaching pieces pinch and are fixed to the protruded portions without play, thereby eliminating wear at the fitting portions and the destruction owing thereto, promoting the positioning accuracy and facilitating the mounting operation thereof to a rear bracket.

EXAMPLE 7

FIGS. 15A and 15B are respectively a front diagram and a side diagram showing a seventh embodiment of a brush device according to the present invention, wherein notations 201 through 203, 205a, 205b, 206a, 206b, 207, 208, 210 and 211 are the same as in FIGS. 18A and 18B. A reference numeral 220 is a brush holding frame, for instance, formed of a synthetic resin, provided with pairs of brush accommodating portions 220a and 220b, which are open at end portions thereof in the axial direction and at inner peripheral portions thereof in the radial direction. The accommodating portions 220a accommodate the positive brushes 205a and the brush springs 208, whereas the accommodating portions 220b accommodate the negative brushes 205b and the brush springs 208. In the brush holding frame 220, a pair of protruded portions 220c are extended to the top side and the bottom side thereof, on the side of an end face of which a stepped stopper portion 220d is formed.

As shown in FIGS. 15A and 15B, an insulation plate 221 touches the end face of the brush holding frame 220 in the axial direction, and engages with the stepped stopper portion 220d. The insulation plate 221 is pinched and retained to the protruded portions 220c by U-shaped attaching pieces 222a and 222b made of a metallic material. FIG. 16 is a sectional diagram showing the brush accommodating portion 220a.

As shown in FIGS. 17A and 17B, a side sectional diagram and a bottom view respectively, in the attaching pieces 222a and 222b, in contrast to first straight portions of the U-shaped attaching pieces wherein tapped holes 222c are formed, tap accommodating holes 222d having hole diameters which are equal to or larger than the diameter of the tapped holes 222c, are previously provided in second straight portions of the U-shaped attaching pieces at positions corresponding to those of the tapped holes 222c. This tap accommodating hole 222d may be formed by cutting off the attaching piece in a U-shaped form as shown in FIG. 17B or in a circular form. In forming the tapped hole 222c at the first straight portion by a tap 215, the front end portion of the tap 215 is accommodated by the tap accommodating hole 222d, thereby easily forming a complete female screw by a single kind of tap.

As stated above, according to the present invention, the tap accommodating holes which accommodate the front end portion of the tap, are previously provided in the second straight portions of the U-shaped attaching pieces at the positions corresponding to the tapped holes formed at the first straight portions of the U-shaped attaching pieces. Therefore, in forming the tapped holes in the first straight portions, the complete female screws having a required length can easily be formed by a single kind of tap, and the fixing thereof by attaching screws from a rear bracket can be performed with certainty.

EXAMPLE 8

FIGS. 21A and 21B are respectively a front diagram and a side diagram of an eighth embodiment of a brush device according to the present invention, wherein notations 301 through 303, 305a, 305b, 306a, 306b, 307, 308, 309a, 309b, 309c, 310 and 311 are the same as in FIGS. 24A and 24B. A reference numeral 320 designates a brush holding frame, for instance, formed by a synthetic resin, provided with pairs of brush accommodating portions 320a and 320b, which are open at end portions thereof in the axial direction and at inner peripheral portions thereof in the radial direction. The brush accommodating portions 320a accommodate the positive brushes 305a and the brush springs 308, whereas the brush accommodating portions 320b accommodate the negative brushes 305b and the brush springs 308. In the brush holding frame 320, a pair of protruded portions 320c are extended to the top side and bottom side thereof in the radial direction, on the side of an end face of which a stepped stopper portion 320d is formed.

As shown in FIGS. 21A and 21B, an insulation plate 321 touches the end face of the brush holding frame 320 in the axial direction, and engages with the stepped stopper portion 320d. FIG. 22 is a sectional diagram showing the brush accommodating portion 320a. In FIGS. 21A and 21B, a notation 320m designates guiding-through portions provided at the brush holding frame 320, composed of guide holes which are positioned and guided by passing through bolts 316 (shown by a chain line) therethrough in the axial direction. At the entrance of the guiding-through portion 320m, a tapered face 320n is formed, thereby easily passing a front end of the through bolt 316 and performing the positioning.

The mounting of the brush device integrated as above to the motor, is performed as in the conventional device. The through bolt 316 inserted from the rear bracket on the top side, is guided by the tapered face 320n at the entrance of the guiding-through portion 320m and the brush holding frame 320 is positioned by passing through bolts 316 through the guiding-through portions 320m. In this way, the tapped holes 309c of the attaching pieces 309a and 309b are aligned to the screws 303 of the rear bracket 302, thereby easily performing the attaching the attaching pieces to the rear bracket.

EXAMPLE 9

FIG. 23 is a perspective view of a guiding-through portion of a brush holding frame showing a ninth embodiment of this invention. At the periphery of the brush holding frame 320, a pair of guiding-through portions 320p are formed on the both sides thereof at positions through which the through bolts 316 pass. The guiding-through portion 320p is constructed as follows. A notation 320r designates a pair of opposing guiding protrusions, between which a guiding slot 320s is formed which passes and guides the through bolt 316 in the axial direction. At the entrance of the guiding slot 320s, tapered faces 320t are formed, thereby facilitating the insertion of the through bolt 316.

As stated above, according to the present invention, a pair of guiding-through portions are provided at the outer periphery of the brush holding frame on the both sides thereof which guides and positions the through bolts from the rear bracket in the axial direction. Therefore, the tapped holes of the attaching pieces pinching and fixing the brush holding frame, are aligned with the position of the screws from the rear bracket, and the attaching is easily performed, thereby facilitating the mounting operation. Accordingly, an automation of mounting is made possible.

We claim:
1. A brush device comprising:
   a brush holding frame made of an insulation material provided with a plurality of brush accommodating portions, said brush accommodating portions being open at end portions in an axial direction and at inner peripheral portions in a radial direction, and a pair of protruded portions at opposing outer ends of said brush holding frame in the radial direction;
   brushes accommodated in said brush accommodating portions along with brush springs, press-contacting a commutator of a direct current machine;
   an insulation plate touching an end face of said brush holding frame in the axial direction, covering the open portions at said end portions of the brush accommodating portions;
   a pair of U-shaped attaching pieces mounted on and pinching both end faces of said pair of protruded portions of the brush holding frame thereby fixing said insulation plate to said end face of the brush holding frame in the axial direction; and
   tap accommodating holes previously provided for accommodating front ends of taps for machining tapped holes at positions of first straight portions of said U-shaped attaching pieces in correspondence to tapped holes of second straight portions of said U-shaped attaching pieces.

* * * * *